United States Patent [19]
Zweben et al.

[11] Patent Number: 5,751,958
[45] Date of Patent: May 12, 1998

[54] ALLOWING INCONSISTENCY IN A DISTRIBUTED CLIENT-SERVER APPLICATION

[75] Inventors: Monte Zweben, San Francisco; Michael J. Deale, Sunnyvale; Mark A. Vershel, Palo Alto; Christophe E. Pettus, San Francisco, all of Calif.

[73] Assignee: PeopleSoft, Inc., Pleasanton, Calif.

[21] Appl. No.: 497,506

[22] Filed: Jun. 30, 1995

[51] Int. Cl.$^6$ .................................................. H04L 12/00
[52] U.S. Cl. .................... 395/200.34; 395/200.31; 707/8
[58] Field of Search ............... 395/200.03, 200.04, 395/200.09, 608, 610, 617, 619, 200.34, 200.31, 703; 707/8

[56] References Cited

U.S. PATENT DOCUMENTS

| | | | |
|---|---|---|---|
| 4,495,559 | 1/1985 | Gelatt, Jr. et al. | 364/148 |
| 4,864,507 | 9/1989 | Ebling et al. | 364/149 |
| 4,874,963 | 10/1989 | Alspector | 307/201 |
| 4,931,944 | 6/1990 | Richter et al. | 364/468 |
| 5,237,497 | 8/1993 | Sitarski | 364/402 |
| 5,255,345 | 10/1993 | Shaefer | 395/13 |
| 5,261,069 | 11/1993 | Wilkinson et al. | 395/425 |
| 5,303,328 | 4/1994 | Masui et al. | 395/23 |
| 5,434,994 | 7/1995 | Shaheen et al. | 395/500 |
| 5,490,270 | 2/1996 | Devarakonda et al. | 395/600 |
| 5,577,240 | 11/1996 | Demers et al. | 395/608 |
| 5,581,753 | 12/1996 | Terry et al. | 395/617 |
| 5,581,754 | 12/1996 | Terry et al. | 395/608 |
| 5,603,026 | 2/1997 | Demers et al. | 395/608 |
| 5,623,655 | 4/1997 | Chisaka | 395/608 |
| 5,623,659 | 4/1997 | Shi et al. | 395/608 |

OTHER PUBLICATIONS

M. Zweben et al., "Learning to improve constraint–based scheduling", Artificial Intelligence 58, Elsevier Science Publishers B.V.,1992, pp. 271–296.

M. Zweben et al., "Scheduling and Rescheduling with Iterative Repair", IEEE Transactions on Systems, Man. and Cybernetics. vol. 23, No. 6, Nov./Dec. 1993, pp. 1588–1595.

M. Zweben et al., "Heuristics versus Lookahead in Iterative Repair Scheduling", The Proceedings of the 13th International Joint Conference on Artificial Intelligence, 1993, pp. 1416–1422.

M. Zweben et al., "Scheduling and Rescheduling With Iterative Repair", *Intelligent Scheduling, Chapter 8*, Morgan Kaufmann Publishers, 1994, pp. 241–255.

M. Zweben et al., "The Space Shuttle Ground Processing Scheduling System", *Intelligent Scheduling, Chapter 15*, Morgan Kaufmann Publishers, 1994, pp. 423–449.

*Primary Examiner*—Larry D. Donaghue
*Attorney, Agent, or Firm*—David R. Graham

[57] ABSTRACT

The invention enables multiple users to simultaneously access and change the contents of a database in a flexible manner. Each user interacts with a working copy of a master copy of the database. The contents of each of the working copies of the database can be accessed and manipulated so that the contents of the working copy of the database can be revised. Each user has control over whether to the "publish" revisions made to the contents of that user's working copy of the database, i.e., write the revisions to the master copy and present other users with the option of including the revisions in the working copies of those other users. Each user has the option to reject revisions published by other users so that the contents of each user's working copy of the database may or may not be maintained consistent with other working copies of the database operated on by other users. However, in order to ensure data integrity of the master database, each user that rejects the inclusion of revisions published by another user is prospectively prevented from publishing revisions to other users, until the user accepts the previously rejected published revisions. The invention employs a distributed architecture that allows each user to interact with that user's working copy of the database in a way that is controlled by that user without impairing the functionality of the database for other users. The database inconsistency allowed by the invention facilitates the performance by users of "what-if" analyses.

20 Claims, 6 Drawing Sheets

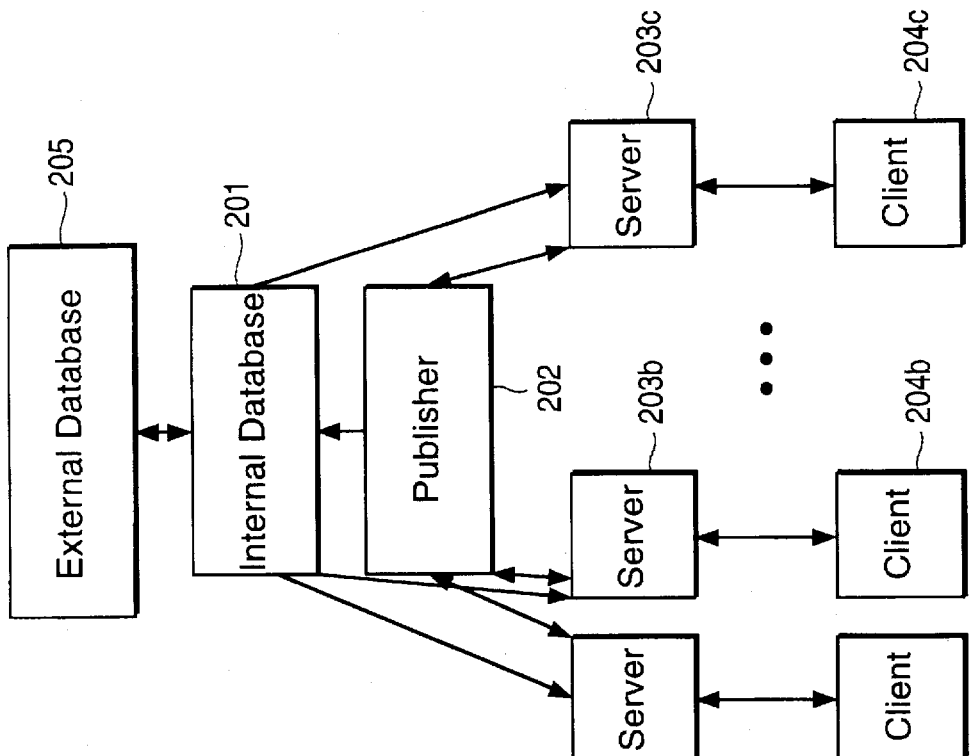
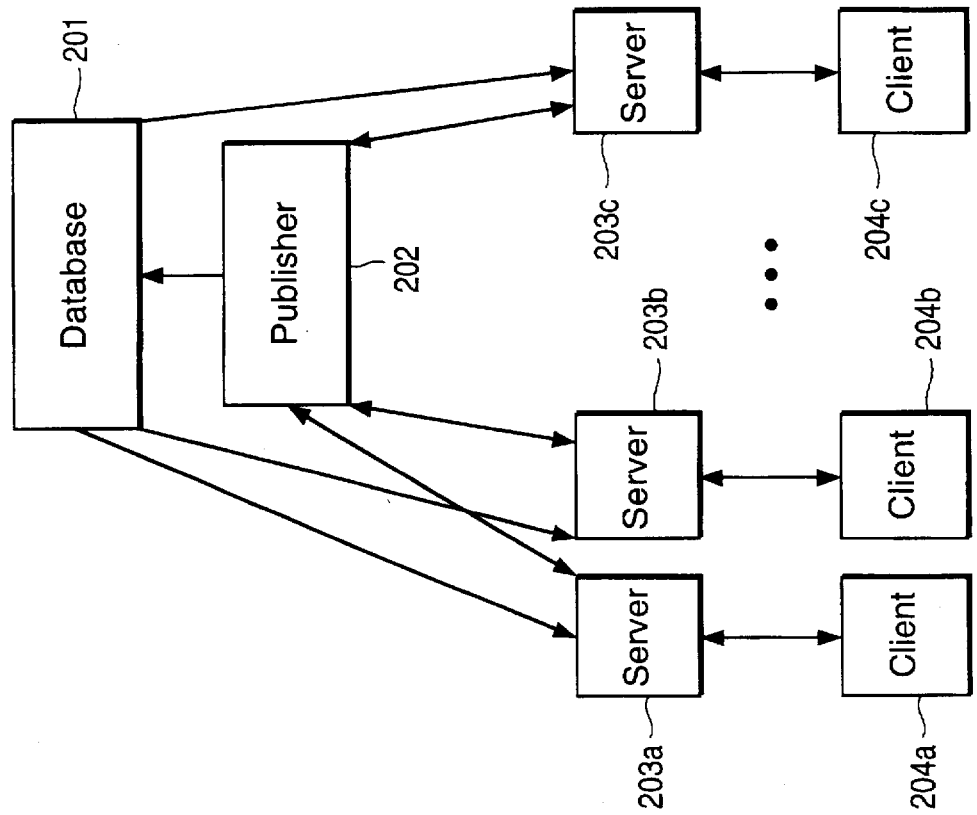
FIG. 2B
FIG. 2A

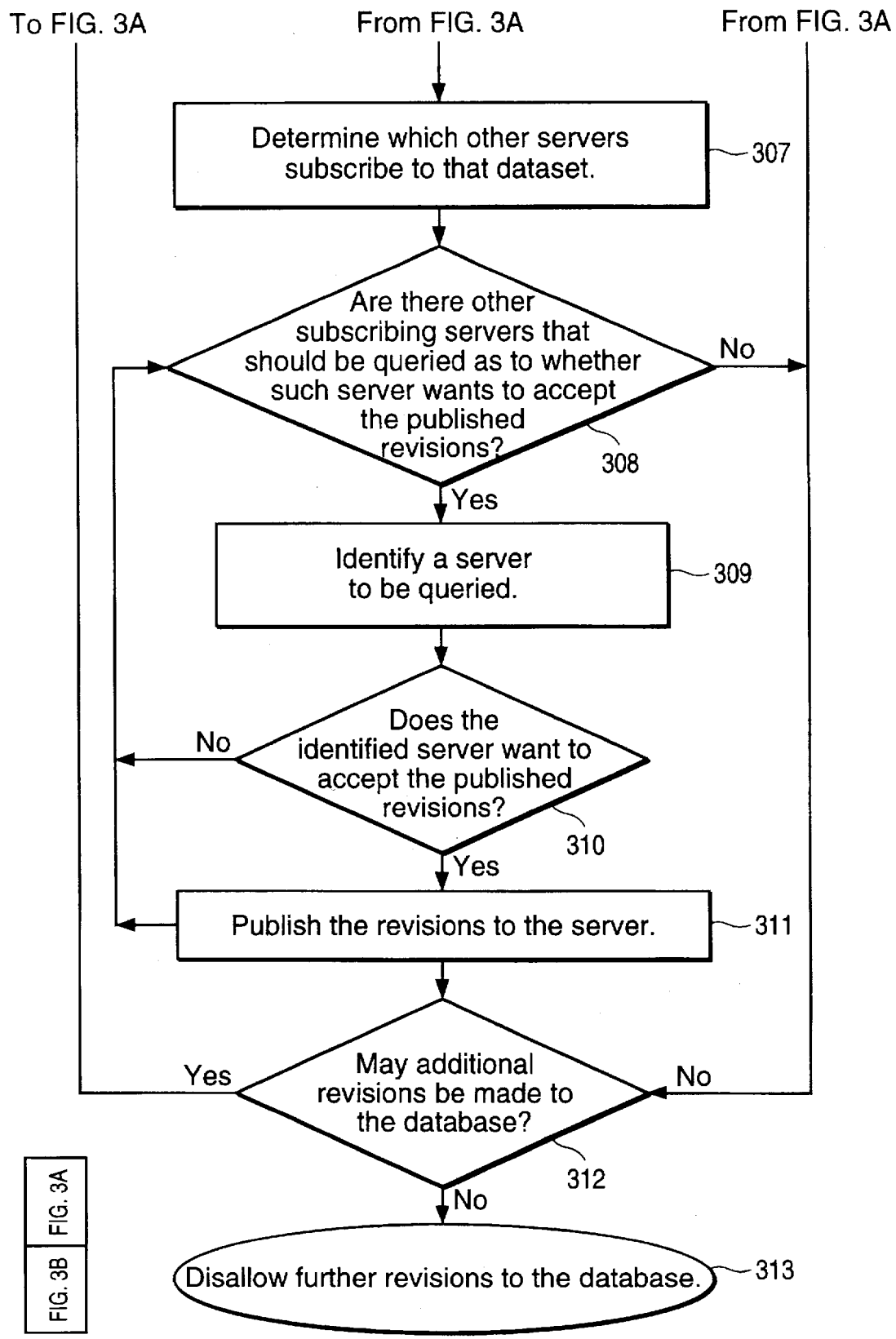

ALLOWING INCONSISTENCY IN A
DISTRIBUTED CLIENT-SERVER
APPLICATION

CROSS-REFERENCES TO RELATED APPLICATIONS

This application is related to and incorporates by reference the commonly owned, co-pending U.S. patent application Ser. No. 08/321,603, entitled "Iterative Repair Optimization with Particular Application to Scheduling for Integrated Capacity and Inventory Planning," by Monte Zweben, Michael J. Deale, Eugene D. Davis and Brian L. Daun", filed on Oct. 11, 1994, and the commonly owned, co-pending U.S. patent application Ser. No. 08/372,047, entitled "Net Change Management for Object-Oriented Modeling," by Monte Zweben and Michael J. Deale, filed on Jan. 10, 1995.

BACKGROUND OF THE INVENTION

1. Field of the Invention

This invention relates to databases and, in particular, to a distributed architecture for enabling multiple users to simultaneously access and change the contents of a database.

2. Related Art

A "database" is a structured collection of information. A database can be stored electronically in a computer memory. Computer databases typically include a multiplicity of "records." Each record includes a related subset of the information in the database. Typically, each record includes one or more "fields." As the database is used or evaluated by a user, a field is the smallest unit of data in the database. Usually, each record includes the same type and amount of data, i.e., the same type and number of fields.

In many applications, a database must be accessible to multiple users at the same time. FIG. 1A is a block diagram illustrating a typical client-server system 100 that enables simultaneous multiple-user access to a database. The system 100 includes a server 101 (typically implemented using a digital computer), a multiplicity of clients (each typically implemented using a digital computer), e.g., clients 102a, 102b and 102c, referred to collectively as clients 102, and a database 103 (stored, for example, on a hard disk or other permanent storage medium). The system 100 can include any number of clients 102. The server 101 controls interaction between the clients 102 and the database 103. Each of the users interacts with the database 103, using a corresponding client 102, to, for example, perform an analysis of some aspect of the database 103 or to update values in the database 103.

Simultaneous use of the database 103 by multiple users creates potential problems in ensuring that all users are working with a "correct" version of the data. Maintenance of "data consistency" (such as read consistency and prohibition of simultaneous writing to the same data element) in a database has been mandatory. For example, maintenance of read consistency means that once a user begins an interaction with the database, the data in the database maintains the same values (except insofar as that user changes the values of the data) throughout the interaction, i.e., the value of the data being read by the user does not change during the time that the user is reading the data. This is necessary to ensure that users are not working with stale data during the time that they are interacting with the database.

Historically, read consistency has been maintained in databases by using "locks." For example, access to a database has been controlled using "read locks" and "write locks." A read lock prevents other users from updating a record during the time that the record is being read by another user. A write lock prevents other users from reading a record during the time that the record is being written (i.e., revised) by another user or prevents other users from writing to that record. The use of read locks and write locks causes access to the database to be undesirably slow because requests to access the database must be held in a queue until any locks that block the request are released.

Cache consistency methods have been used to enhance interaction with a database by multiple users. FIG. 1B is a block diagram illustrating a system 110 for implementing a cache consistency method that enables simultaneous multiple-user access to a database. The system 110 is similar to the system 100 and like elements are designated by like numerals. The system 110 additionally includes a multiplicity of cache memories (referred to collectively as cache memories 104), e.g., cache memories 104a, 104b and 104c. Each client 102 corresponds to one of the cache memories 104. The system 110 can include any number of cache memories 104 and corresponding clients 102. The server 101 controls interaction between each combination of a cache memory 104 and client 102, and the database 103. Each of the users interacts with the database 103 through one of the combinations of a cache memory 104 and client 102.

In a cache consistency method, when each user wants to read data from the database 103, the data is stored in the cache memory 104 associated with the client 102 that the user is using. When a user is finished working with the data, the revised data is sent from the cache memory 104 to the server 101. The server 101, in turn, transfers the revised data to the database 103. The server 101 also notifies the other cache memories 104 that include data that has been affected by the revisions that the data currently in those cache memories 104 must be replaced with the updated data. While it is possible to delay the acceptance of the updated data, ultimately such acceptance must occur. Thus, it is not possible to allow certain users to work with a copy of the database 103 that includes data that is inconsistent with the data in other copies of the database 103, as is desirable when multiple users are simultaneously using the database 103.

One approach that has been used to enhance interaction with a database by multiple users is versioning. In versioning, read locks are not used. Instead, each user is given a copy of the current version of the data at the beginning of that user's request to read data from the database. Each user can, therefore, write to the database without blocking other users from reading data from the database, since those users are reading their own version of the data. Likewise, each user's read of the data does not block other users from writing to the database. However, to prevent conflicts, each time that a user writes to the database, other users are prevented from writing to the same data that is being updated by the user.

Since versioning eliminates the need for read locks, updating of the database is made quicker for each user of the database, since users do not need to wait for read locks to be released before writing data. This is particularly important in decision-support database applications (where read times are typically very long to allow for analysis), since, otherwise, making revisions to the database would be far too cumbersome. Additionally since some implementations of versioning eliminate the need for write locks that prevent read access, database access is made quicker for each user of the database, since users do not need to wait for write locks to be released before reading data. This is particularly important in database applications that require a lot of updates, since, otherwise, analysis (which typically requires a lot of read time) of the data would be extraordinarily time consuming because of the necessity to wait for release of the write lock associated with each update. In summary, database applications that require significant amounts of both analysis and updating have significant performance problems without the use of versioning.

Despite these advantages, versioning also has some disadvantages. In versioning, each time a user attempts to write to the database, a check is made to determine the version of the data with which the user began. If that version is different than the current version of the data (i.e., the data values are not the same), then the user is precluded from writing to the database. Thus, any revisions that the user has made to the data as a result of his work with the data cannot be incorporated into the database, i.e., the work that the user has done is for naught. The user must read the new version of the data, then redo his work. Moreover, each user does not know at the time that he begins his work whether the activity of other users may negate his efforts, providing a disincentive to engage in lengthy transactions without taking a write lock on the data.

Another approach that has been used to enhance interaction with a database by multiple users is replication. In replication, a copy of a version of the data as the data exists at a particular point in time is stored on each a multiplicity of servers. One or more users can access and manipulate the data stored on each server. (Use of the database by multiple clients on each server is still subject to the problems with a standard client-server database system, as discussed above.) The one or more users engage in transactions with the data on each server, typically resulting in revisions to at least some of the data. Usually, the revisions made on the various servers are not completely consistent with each other. Thus, after activity has been completed on each server, the inconsistent copies of the data are reconciled. This can be done automatically by a computer using predefined reconciliation rules, manually by a person who compares the various copies of the data, or partly by a computer and partly by a person.

Replication has been used for resolving the problem of allowing different facilities (separated by wide area networks, or WANs) to access a database or a subset of the database rather than having all users at every facility access the database through a single server. Replication has been used to dedicate one server for use in activity that requires long read times (e.g., analysis activity such as decision support) and another server for use in activity that requires only short read and/or write times (e.g., on-line transaction processing, or OLTP). However, this often doesn't work well because analysis is being done on data that has since been changed. By the activity requiring a short read and/or write time. Generally, replication can be used effectively with databases that can be partitioned into subsets that are, to a large degree, disjoint, since the data in one subset can be revised without greatly affecting the data in the other subset or subsets. Since the subsets are largely disjoint, any conflicts can be easily resolved in the later reconciliation. Replication is also useful where it is desired to provide redundant data on each of two servers so that failure of one server can be easily overcome with little downtime, by switching the users of that server over to the other server.

Replication has some disadvantages. First, it may not be possible to reconcile all of the different copies of the database. In such a situation, all of the changes made in the various copies of the database must be rolled back to a previous version of the database in which the data in all copies of the database is consistent. Second, for some database applications, it is desirable to allow certain users to work with a copy of the database that includes data that is inconsistent with the data in other copies of the database. Replication does not allow this, since the data must ultimately either be reconciled, or all changes rolled back.

In addition to the above-described data consistency problems, the typical system for using a database has been undesirably slow because the database is usually stored on a hard disk or other permanent storage medium, as described above with respect to FIGS. 1A and 1B. The large body of data that typically must be transferred to the database when revisions are written to the database can preclude storing the database in a memory, such as a random access memory, that can be more rapidly accessed during interactions with the database. Thus, transactions with the database must be made using relatively slow and cumbersome distributed input/ output processes for transferring data to the permanent storage medium. Given the current state of hardware for storing data, it would be desirable to be able to use a more readily accessible memory, such as a random access memory (RAM), to store a database, as well as revisions to a database, during use of the database by a user.

SUMMARY OF THE INVENTION

The invention enables multiple users to simultaneously access and change the contents of a database in a flexible manner. Each user interacts with a working copy of a subset ("dataset") of the data from a master copy of the database. The dataset can include the entire database or only a portion. The contents of each dataset can be accessed and manipulated so that the contents of the dataset can be revised. Each user has control over whether to "publish" revisions made to the contents of that user's dataset, i.e., write the revisions to the master copy and present other users working with the same dataset with the option of including the revisions in those users' copies of the dataset. Each user has the option to reject revisions published by other users so that the contents of each user's dataset may or may not be maintained consistent with other copies of the dataset being used by other users. However, in order to ensure data integrity of the master database, each user that rejects the inclusion of revisions published by another user is prospectively prevented from publishing revisions to other users, until such rejecting user accepts all previously rejected published revisions in the order in which those published revisions occurred.

The invention employs a distributed architecture that allows each user to interact with that user's dataset in a way that is controlled by that user without impairing the functionality of the database for other users. The distributed architecture can be implemented, for example, using one or more digital computers. The user independence is enabled by several features of the invention. First, each user works with a unique working copy of a dataset. For example, each dataset can be maintained on a separate server computer (either physically or logically separate), while the master copy of the database is maintained on a central computer (either physically or logically separate). Second, as described above, each user controls whether revisions to that user's dataset are published. For example, the user can effect this control using a client computer that interacts with an associated server computer to cause the central computer to update the master copy of the database and to present revisions to the other server computers storing working copies of the same dataset for potential update of those working copies. Third, each user may reject revisions published by other users. Again, the user may effect this control using the client computer to appropriately control the server computer.

The database inconsistency allowed by the invention facilitates the performance by users of "what-if" analyses (evaluation of the consequences upon the data in the database of a specified change in one or more designated pieces of data, without saving the resultant revisions to the database) involving the database contents. Since only revisions to a dataset that are published by a user are incorporated into the datasets being used by other users, any user engaged in a what-if analysis can prevent revisions resulting from that user's speculative activity from being published. Thus, a user can perform a what-if analysis, which may change the database contents in a way that is not generally applicable to other users, without affecting the contents of the database as used by other users. Further, since each user has the option of rejecting revisions published by other users, a user engaged in what-if analysis can prevent revisions made by other users from affecting the contents of the dataset being used by that user. Thus, a user can perform a what-if analysis without fear that the activity of other users will change the contents of the dataset in a way that distorts the results of the user's analysis. The capability of rejecting revisions made by other users (thereby establishing inconsistency with the datasets of those users) is a capability not found in previous techniques for managing the use of a database by multiple users. Further, the invention allows such inconsistency to go on indefinitely. Additionally, unlike, for example, replication, the invention allows revisions to be made to the master database even though not all of the working copies of datasets have been reconciled.

The invention can be advantageously used with a net change management technique to enable user transactions with the dataset to be performed rapidly. Net change management requires only the storage of one of the current or initial version of the dataset and a record of the changes made between the initial and current versions of the dataset. Thus, all information necessary to represent both the current and initial versions of the dataset can be stored using a relatively small amount of memory capacity. Consequently, both the current and initial versions of the dataset can be stored in a memory, such as a random access memory (RAM), that allows rapid access to and updating of the dataset, thereby enabling faster interaction with the dataset than has previously been the case with database interactions. However, the invention is also applicable when the dataset is stored on a hard disk or other permanent storage medium; particularly with appropriate technological developments in such media, the invention can advantageously be implemented on those media as well.

The invention makes use of a method for resolving inconsistencies between different versions of a dataset in order to allow users to accept revisions published by other users. Any appropriate method can be used, and the method used will depend upon the particular characteristics of the dataset. Inconsistencies can be resolved in real-time, enabling users to continually use the most recent version of the dataset, if desired. Further, inconsistencies are resolved in a manner that does not cause previously made changes by a user to be undone by acceptance of revisions published by other users. In particular, the above-described net change management technique is advantageously used to enable this feature of the invention, since each user's working copy of the dataset can be updated by incorporating the net changes. Since the working copy is updated by revising data values according to changes in those data values, rather than replacing the data values with new values irrespective of the existing data values, previously made changes to the data values in the working copy being updated are not overridden. Further, net change management enables reconciliation of published revisions with working copies of datasets on other servers to be done in a relatively short amount of time.

BRIEF DESCRIPTION OF THE DRAWINGS

FIG. 2A is a block diagram illustrating a system according to the invention for enabling multiple users to simultaneously access and change the contents of a database in a flexible manner.

FIG. 2B is a block diagram illustrating a system according to another embodiment of the invention that is a modified version of the system of FIG. 2A.

FIGS. 3A and 3B are, together FIG. 3, a flow chart illustrating a method according to the invention for controlling publication of database revisions, the method capable of being implemented in, for example, the publisher shown in FIG. 2A or 2B.

DETAILED DESCRIPTION OF EMBODIMENTS OF THE INVENTION

Figure 1A:
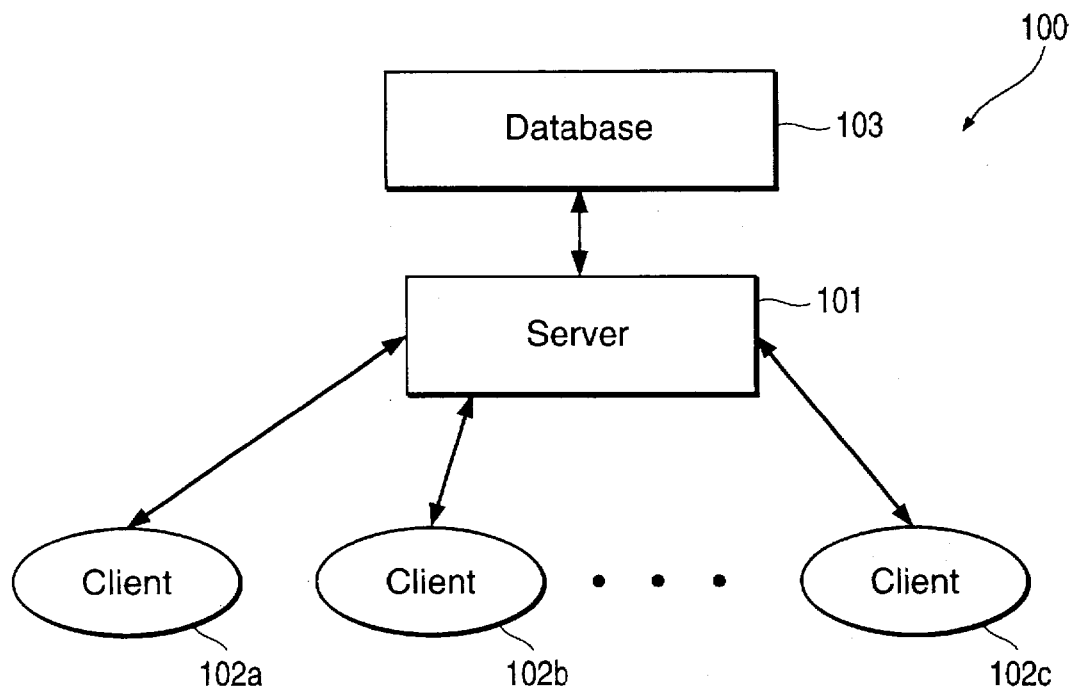
FIG. 1A is a block diagram illustrating a typical client-server system that enables simultaneous multiple-user access to a database.

FIG. 2A is a block diagram illustrating a system 200 according to the invention for enabling multiple users to simultaneously access and change the contents of a database in a flexible manner. The system 200 is a distributed architecture that allows each user to interact with a database in a way that is controlled solely at the direction of that user, without impairing the functionality of the database for other users. For example, the system 200 can be used by different schedulers for a manufacturing enterprise, each scheduler handling a portion of the overall schedule, such as production of a particular part or parts, or equipment capacity management for a particular factory.

The system 200 includes a database 201, a publisher 202, one or more servers (referred to generally as servers 203) and one or more clients (referred to generally as clients 204). The database 201 can be stored, for example, on a hard disk or other persistent storage medium. The publisher 202, servers 203 and clients 204 can all be implemented by, for example, one or more digital computers. Each server 203 is logically separate and may, but need not necessarily, be physically separate, e.g., the servers 203 can be implemented in a single or multiple digital computers. Communication among the database 201, publisher 202, servers 203 and clients 204 is enabled using conventional communications hardware and techniques. The functionality of the servers 203 and the clients 204, as well as the communication between the servers 203 and clients 204, is implemented using conventional techniques known to those skilled in the art of implementing client-server networks.

Servers 203a, 203b and 203c and corresponding clients 204a, 204b and 204c are illustrated in FIG. 2A; however, any number of servers 203 and corresponding clients 204 can be used. One or more clients 204 can be associated with each of the servers 203; however, as will be apparent from the description below, if more than one client 204 is associated with a server 203, the activity of each client 204 must be coordinated external to the system 200 with the activity of each other client 204 associated with that server 203 (thus, in the description of the invention herein, "client" will be used to refer to both a single or multiple clients associated with a single server).

Each user interacts with a working copy of a subset ("dataset") of a master copy of the database 201. The dataset can include some or all of the data in the database 201. As shown in FIGS. 2A and 2B, the database 201 can communicate data directly to each of the servers 203. Each user "subscribes" to a dataset, causing a copy of the dataset to be sent to the server 203 and stored in a memory of the server 203. The user can also "check out" a dataset. Checking out a dataset allows the user to later "publish" (explained below) revisions to the dataset. The contents of each of the datasets stored in a server 203 can be accessed and manipulated by a user in a desired manner through the corresponding client 204. As a result, usually the contents of the dataset are revised. Each user controls whether to "publish" revisions (i.e., write the revisions to the master copy of the database and allow other users working with affected datasets to include the revisions in those users' datasets) made to the contents of that user's dataset. Each user also controls whether to accept or reject revisions published by other users. However, in order to ensure data integrity of the master copy of the database 201, each user that rejects the inclusion of revisions published by another user is prospectively prevented from publishing revisions to other users, until the rejecting user accepts all previously rejected published revisions in the order in which those published revisions occurred. In order to enable such "late" acceptance of published revisions, each set of published revisions is stored in a memory, as well as information that indicates the order in which the published revisions occurred. The net change management technique, described in more detail below, in which revisions are represented only by the net changes in a dataset is particularly advantageous in enabling this aspect of the invention, since storing only the net changes requires a relatively small amount of memory capacity.

The system 200 enables users associated with each server 203 to work with the database 201 independently of the interaction with the database 201 of other users (i.e., data inconsistency is allowed between working copies of datasets from the database 201). This user independence is enabled by several features of the system 200: the provision of a unique working copy of a dataset for each user, control by each user over whether revisions to that user's dataset are to be published, and the option of each user to reject revisions published by other users. The capacity to work with the database 201 independently of the interaction of other users enables a user that wants to analyze a dataset from the database 201 in a manner that need not or should not be affected by other users or, conversely, that need not or should not affect other users to do so without being affected by or affecting those other users.

For example, the database inconsistency allowed by the system 200 facilitates the performance by users of "what-if" analyses involving the database contents. Since only published revisions are incorporated into the datasets of other users, a user can perform a what-if analysis, which may change the database contents in a way that is not generally applicable to other users, without affecting the contents of the datasets used by other users. Further, since each user has the option of rejecting revisions published by other users, a user engaged in what-if analysis can prevent revisions made by other users during the analysis from affecting the contents of the dataset in a way that distorts the results of the analysis. The invention allows database inconsistency to exist indefinitely. Returning to the example of scheduling for a manufacturing enterprise, the data inconsistency allowed by the invention enables, for example, one scheduler to analyze the results of adding a new factory, piece of equipment or part supplier to the schedule without affecting the day-to-day scheduling activity that is being performed by one or more other schedulers.

The system 200 also enables a user to incorporate into the user's dataset revisions that result from the activity of other users, without losing the results of any work already done with the dataset. The incorporation of such revisions necessitates the use of a method for resolving inconsistencies between the revisions and the dataset that is to be updated. Inconsistencies can be resolved in real-time, enabling users to continually use, if desired, the most current and valid version of the data in a dataset. Any appropriate method can be used, and the method used will generally depend upon the particular characteristics of the database. For example, in a scheduling system, inconsistencies may result in the violation of constraints that have been placed on the schedule. A method and system for resolving such constraint violations is described in commonly owned, co-pending U.S. patent application Ser. No. 08/321,603, entitled "Iterative Repair Optimization with Particular Application to Scheduling for Integrated Capacity and Inventory Planning," by Monte Zweben, Michael J. Deale, Eugene D. Davis and Brian L. Daun", filed on Oct. 11, 1994, the pertinent disclosure of which is incorporated by reference herein. As an example, in the scheduling context, this feature of the invention enables different schedulers to change particular inputs to the schedule for which they are responsible (e.g., equipment availability, parts supplies) and incorporate the incremental schedule changes into the enterprise-wide schedule while other schedulers are engaging in similar activity, without preventing those other schedulers from determining similar incremental schedule changes.

The system 200 is particularly useful where updates to the content of a dataset are recorded using a set of stored data representing the changes ("net changes") between the initial state of the dataset at the beginning of a user interaction with the dataset and an ending state of the dataset after the user has completed his interaction and wants to update the values of the data in the database to conform to the values resultant from the user's interaction (herein termed "net change management"). A method and system for implementing such net change management with a database that stores object-oriented data used to model, for example, an operation for which a schedule is to be determined is described in commonly owned, co-pending U.S. patent application Ser. No. 08/372,047, entitled "Net Change Management for Object-Oriented Modeling," by Monte Zweben and Michael J. Deale, filed on Jan. 10, 1995, the pertinent disclosure of which is incorporated by reference herein. In particular, the net change management technique is described in detail therein at, for example, pages 34–42, and is briefly described below.

Figure 1B:
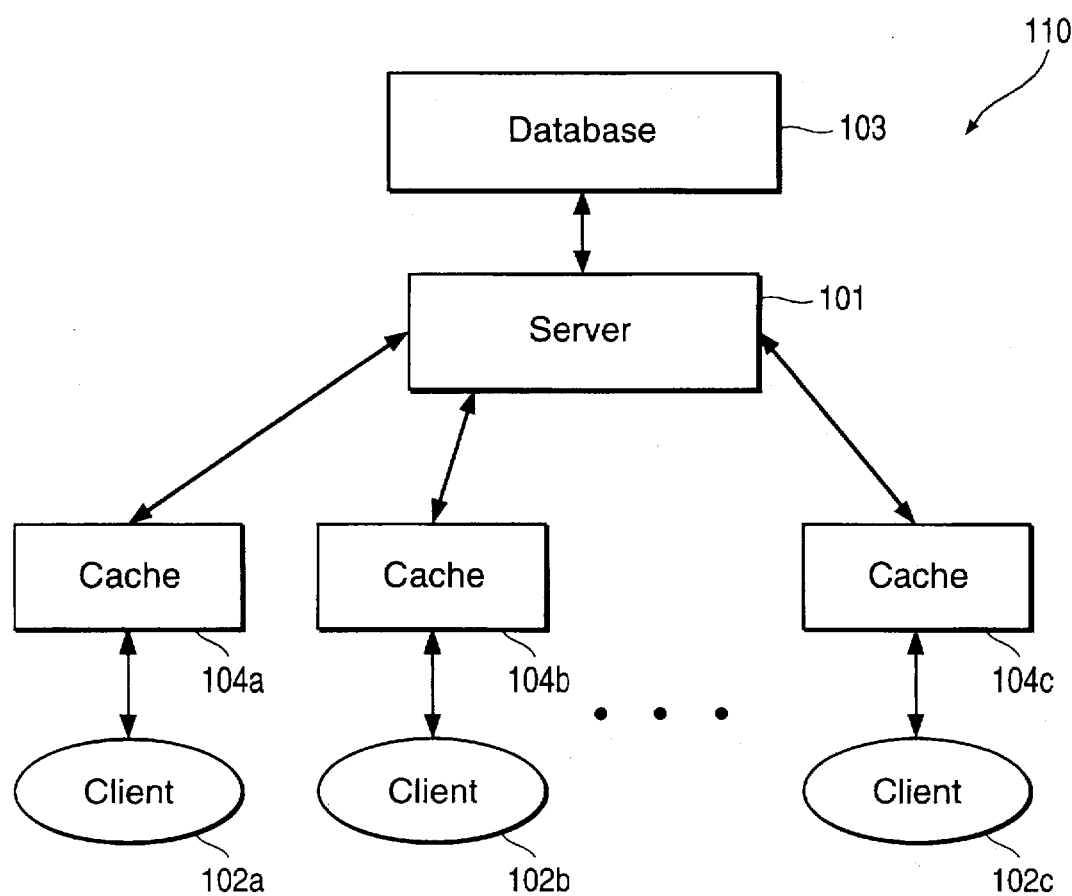
FIG. 1B is a block diagram illustrating a system for implementing a cache consistency method that enables simultaneous multiple-user access to a database.

Each dataset can be stored in a non-persistent memory that can be rapidly accessed, such as a random access memory (RAM). As a user works with the dataset, the dataset is continually updated in the RAM. As each change is made, the initial value of the data that has been changed is stored. Since only the current state of the dataset and a record of the changes made must be stored, all information necessary to represent both the current and initial states of the dataset can be stored using a relatively small amount of memory capacity. Consequently, both the current and initial versions of the dataset (i.e., the current version of the dataset and the net change information) can be stored in a memory, such as a RAM, that allows rapid access to and updating of the dataset. Thus, interaction with the dataset is much faster than has previously been the case for interaction with databases. In contrast, previous systems for implementing multiple-user access to a database (see FIGS. 1A and 1B) have required data to be retrieved from a hard disk when the database is accessed, then written to the hard disk when the database is updated, a process that is much slower than the corresponding process executed entirely within a RAM.

Though in the description immediately above, the invention is advantageously implemented with the dataset stored in a RAM, it is to be understood that the invention can also be implemented with the dataset stored on a hard disk or other permanent storage medium. Particularly if technological advances enable quicker access to such storage media, the invention may also be advantageously implemented with the dataset stored on a permanent storage medium.

Additionally, net change management can be advantageously used to enable the reconciliation of inconsistent data that occurs when published revisions are accepted by a user, since each user's working copy of the dataset can be updated by incorporating the net changes. Since the dataset is updated by revising data values according to changes in those data values, rather than replacing the data values with new values irrespective of the existing data values, previously made changes to the data values in the working copy being updated are not overridden. Further, net change management enables reconciliation of published revisions with working copies of datasets on other servers to done in a relatively short amount of time.

The invention is broadly applicable to management of user interaction with any type of database, e.g., an object-oriented database or a relational database. The invention can be used with, for example, an object-oriented database that is used in implementation of the above-referenced U.S. patent application Ser. No. 08/321,603. However, as shown in FIG. 2B, in some uses of the invention, it may be necessary to translate an existing database 205 ("external database") into the database 201 (referred to as the "internal database" in this embodiment of the invention). The translation can be accomplished using a database translator that can map the structure of the external database 205 to the structure of the internal database 201. The particular characteristics of the database translator depend upon the characteristics of the internal database 201 and the external database 205. Generally, given the characteristics of the databases 201 and 205, the construction of a database translator to perform the required translation can be easily done by one skilled in the art of database translation.

Figure 3A:
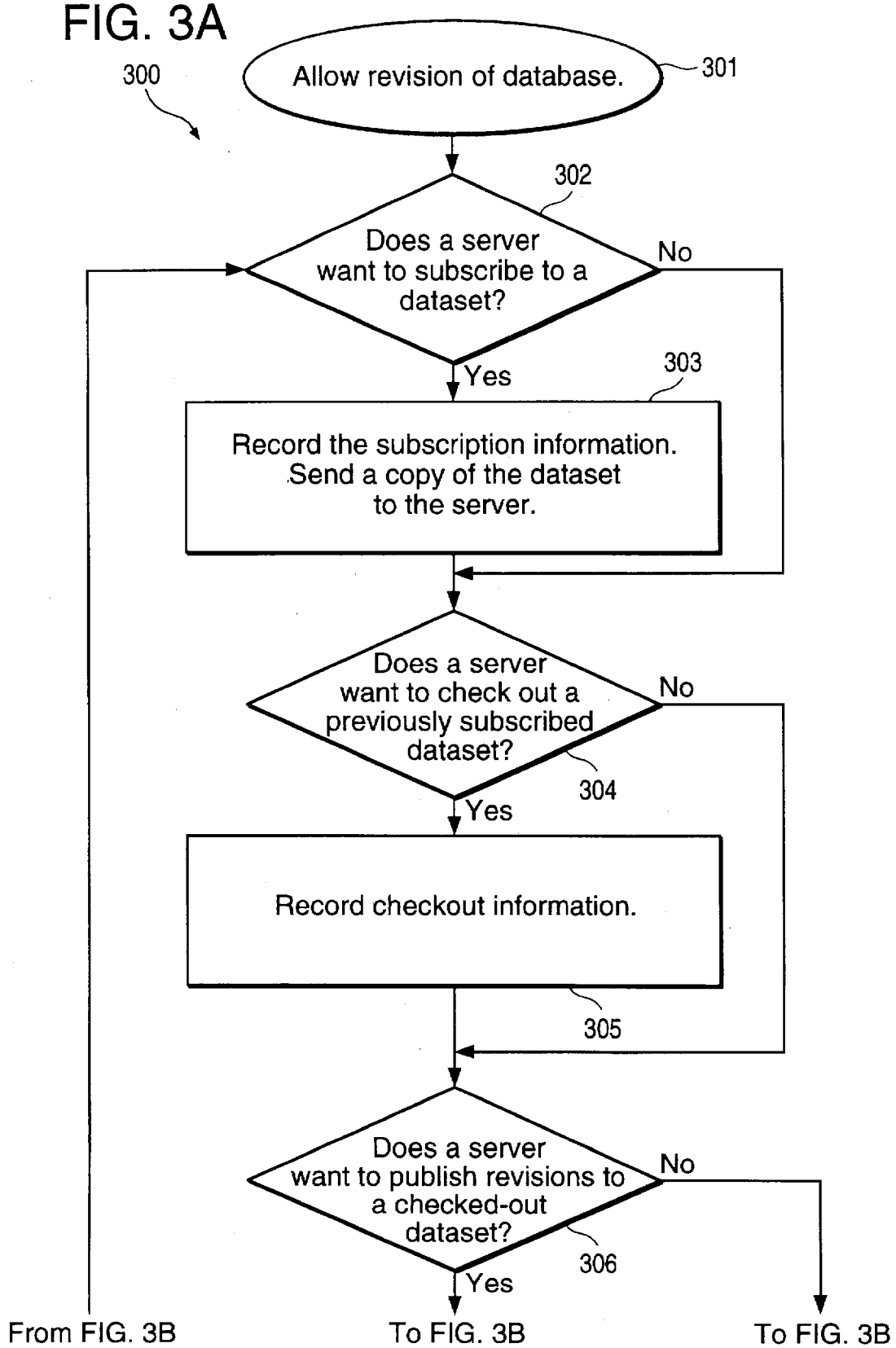

FIGS. 3A and 3B (referred to collectively as FIG. 3) are, together, a flow chart illustrating a method 300 according to the invention for controlling publication of revisions to a database and to other remote apparatus (such as server computers) that subscribe to a dataset affected by the revisions. In the system 200 (FIG. 2A), the method 300 can be implemented, for example, by a digital computer, as described above, that is used to implement the publisher 202 and store the database 201. The method 300 is described below as so implemented in the system 200. It is to be understood that the method 300 is merely illustrative of a series of steps that can be implemented to perform the functions accomplished by the method 300. For example, other equivalent methods performing the same functions can include different specific steps. The important aspect of the method 300 is the performance of the functions of accepting subscriptions to datasets, checking out data sets (if desired), and coordinating the publishing of revisions.

In step 301, the allowance of revisions to the database is begun. Revisions to the database may be allowed, for example, during a defined time period each day or on particular days. For example, revisions may be allowed only during a predefined "working hours" period on each predefined "work day." In such a situation, step 301 can be initiated automatically at the appropriate time by the digital computer in which the method 300 is implemented.

In step 302, a determination is made as to whether one of the servers 203 wants to subscribe to a dataset. This determination can be made, for example, by monitoring an input from each of the servers 203 that indicates whether subscription to a dataset is desired. The servers 203 can subscribe to datasets at any time during the period in which changes can be made to the database. For example, different schedulers may access the scheduling database at different (perhaps predefined) times to begin performing their scheduling activity.

If a server is subscribing to a dataset, then, in step 303, the identification of the subscribing server and the subscribed dataset are recorded. This information can be recorded as a table in a memory, such as a RAM, of the digital computer. A copy of the dataset is sent to the server 203. Generally, the identification of the data to be included in the dataset can be done using an application program that is stored in a memory that is part of the server 203 and that enables the user to engage in transactions with the dataset. For example, a dataset may be selected as one of a plurality of predefined datasets that are specified within the application program. The data is transmitted from the database 201 to a memory, e.g., RAM, in the server 203 using conventional communications apparatus and techniques.

For each server 203 that subscribes to a dataset, a determination is also made as to whether the server 203 wants to check out the dataset, as shown by step 304. This determination can be made, for example, by monitoring an input from each of the servers 203 that indicates whether a dataset to which the server has previously subscribed is to be checked out. A dataset can be checked out at any time after the server 203 has subscribed to the dataset. The server 203 must check out the dataset in order to later publish revisions made to that dataset. However, revisions can be published to a dataset on a server 203 even if that server 203 did not check out the dataset.

If a server wants to check out a dataset, then, in step 305, the identification of that server and dataset are recorded. As with subscription information, this checkout information can be recorded as a table in a memory, such as a RAM, of the digital computer. The publisher 202 uses the information to determine which servers 203 have been enabled to publish revisions.

In step 306, a determination is made as to whether a server wants to publish revisions to a checked-out dataset. This determination can be made, for example, by the publisher 202, which monitors an input from each of the servers 203 that indicates whether the server 203 wishes to publish revisions to the subscribed dataset and looks in the checkout information for the name of any server that wants to publish (the server must have checked out a dataset to be enabled to publish). After a server 203 indicates to the publisher 202 that the server wants to publish, the publisher 202 puts any other received requests to publish on hold until the currently publishing server 203 has completed publishing. Publishing requests are queued-up by the publisher 202 and processed one at a time, i.e., once the current publishing is complete, the next-received request to publish is processed. Each time a publish occurs, regardless of whether revisions are published to any other servers, the revisions are published to the database 201.

After the publisher 202 receives a request to publish, the publisher 202 first determines which other servers 203 ("subscribing servers") subscribed to the dataset for which revisions are being published (or a dataset including data that is being revised by the published revisions), as shown by step 307. This can be done by reviewing the previously recorded subscription information (see step 303). A list of subscribing servers 203 can be recorded in the memory of the digital computer.

The publisher 202 presents the published revisions to each of the subscribing servers 203, in turn, and, for each subscribing server 203 that indicates acceptance of the published revisions, publishes the revisions to the subscribing server 203 (steps 308 through 311). In step 308, the publisher 202 reviews the list of subscribing servers 203 to determine whether any of the subscribing servers 203 have not yet been given the opportunity to accept the published revisions. (As each subscribing server 203 is presented with the option of accepting published revisions, the subscribing server 203 can be appropriately marked in the list of subscribing servers 203.) If such subscribing servers 203 exist, then, in step 309, one of those subscribing servers 203 is identified for presentation of the option to accept the published revisions. In step 310, a determination is made as to whether the subscribing server 203 wants to accept the published revisions. (This determination is explained in more detail below with respect to steps 406 through 408 of FIG. 4.) If the published revisions are accepted by the subscribing server 203, then, in step 311, the revisions are published to that server 203. The revisions are sent from the publisher 202 to the appropriate server using conventional communications apparatus and techniques. If the published revisions are rejected in step 310, then the server 203 is prevented from publishing revisions in the future, until all previously rejected published revisions are accepted. After the published revisions are either rejected (step 310) or accepted (steps 310 and 311), the method 300 continues.

After each subscribing server 203 is given the option of accepting the published revisions, in step 312, a determination is made as to whether additional revisions may be made to the database 201. In other words, step 312 defines the end of the period, begun at step 301, during which revisions to the database 201 are allowed. The end of the period can be defined as the time at which no servers 203 remain subscribed to a dataset. This can be determined by monitoring the list of subscribing servers 203. Alternatively, the end of the period might be a predetermined time, the occurrence of which can be ascertained automatically by the digital computer in which the method 300 is implemented. When step 312 indicates that revisions can no longer be made to the database 201, further revisions to the database 201 are disallowed, as shown by step 313.

A method similar to the method 300 can be implemented in the system 210 (FIG. 2B) by slightly modifying the method 300. The modified method includes an additional step, between steps 301 and 302, in which the external database 205 is loaded into the internal database 201, using a database translator, as described above, if necessary. The modified method also includes another additional step, between steps 312 and 313, in which the revised database 201 is loaded back into the external database 205, again using the database translator if needed.

Figure 4A:
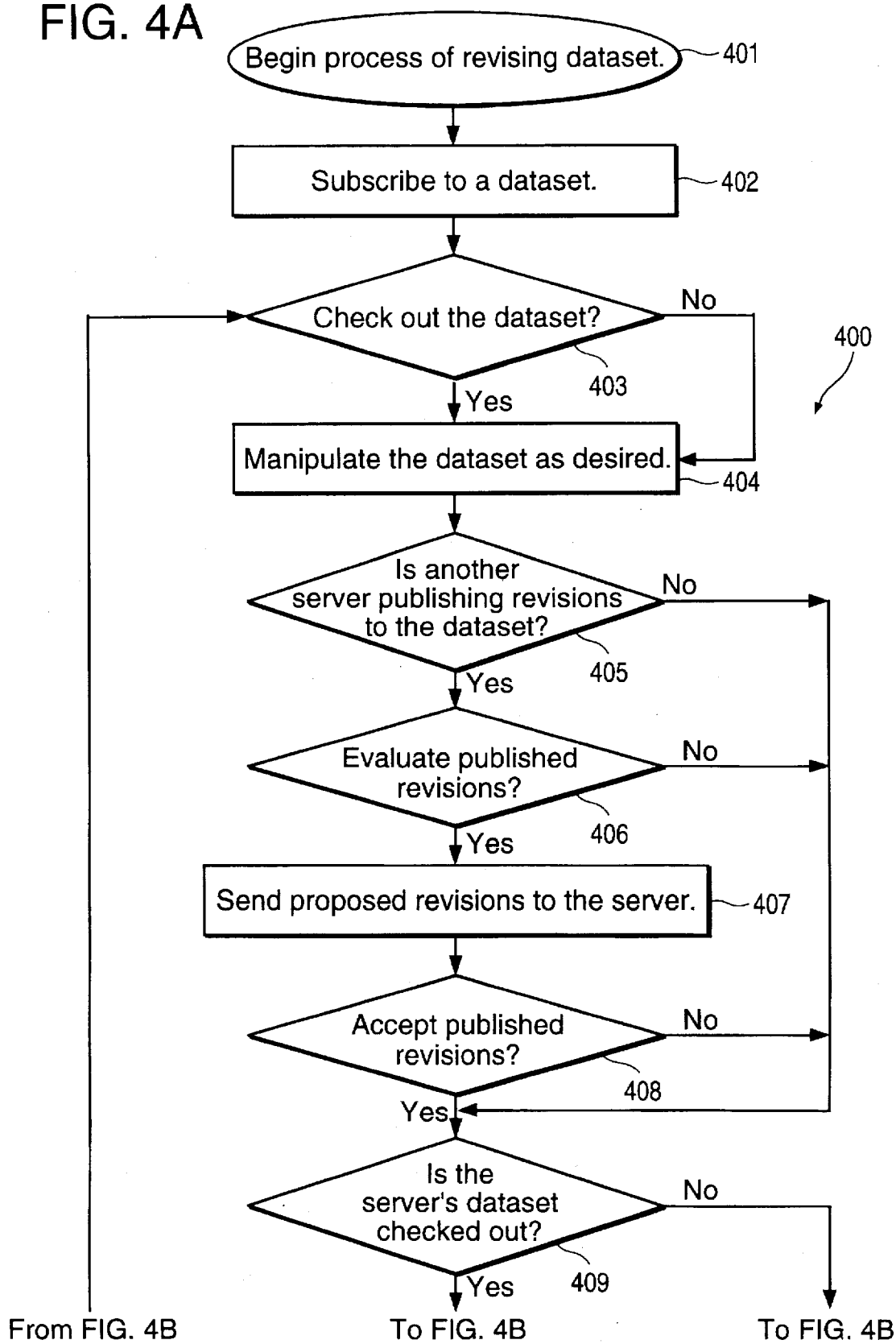
FIG. 4 is a flow chart illustrating a method according to the invention for controlling subscription to, manipulation of, and publication of a dataset, the method capable of being implemented in, for example, one of the servers shown in FIG. 2A or 2B.
Figure 4B:
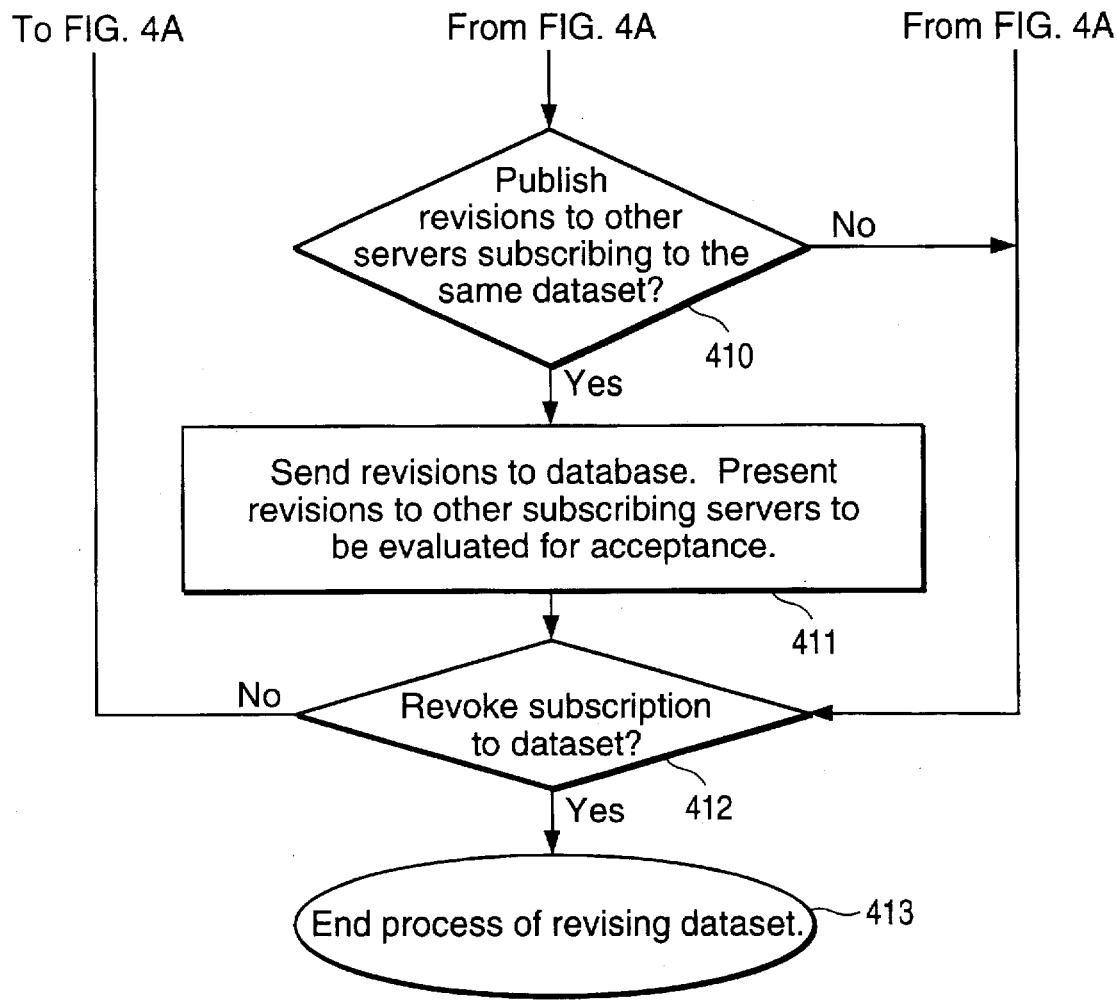
Figure 4:
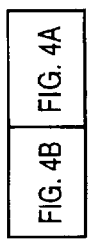

FIG. 4 is a flow chart illustrating a method 400 according to the invention for controlling subscription to, manipulation of, and publication of a dataset. In the system 200, the method 400 can be implemented in, for example, one of the servers 203 shown in FIG. 2A or 2B. The method 400 is described below as implemented in the system 200. It is to be understood that the method 400 is merely illustrative of a series of steps that can be implemented to perform the functions accomplished by the method 400. For example, as will be readily apparent, the exact sequence of steps of the method 400 could be rearranged in other fashions and still perform the same functions. Likewise, other equivalent methods performing the same functions can have a different set of specific steps. The important aspects of the method 400 are the performance of the functions of subscribing to a dataset, checking out the data set (if desired), manipulating (engaging in transactions with) the dataset, accepting or rejecting published revisions from other servers, and publishing revisions.

In step 401, the process of accessing and engaging in transactions with a dataset is begun. Typically, this will be initiated by a user of a particular server 203 (referred to hereinafter, for convenience, as the "local server") using a conventional computer command to instruct the client 204 to control the local server 203 as desired. For example, the step 401 might be initiated by a scheduler using the database 201 to update a manufacturing schedule according to newly obtained information regarding the manufacturing enterprise or to analyze the manufacturing schedule according to certain predefined criteria.

In step 402, the local server 203 is directed to subscribe to a particular dataset, again using the client 204 to appropriately control the local server 203. As described above, subscription to a dataset causes the dataset to be transferred from the database 201 to the local server 203.

In step 403, the local server 203 is directed either to check out the dataset (i.e., enable the local server 203 to publish revisions to the database 201) or not (the local server 203 cannot publish revisions to the database 201). A user intending to engage in what-if analysis may not desire to check out a dataset, for example.

In step 404, the user, through an associated client 204, causes the local server 203 to begin manipulating the dataset in a desired manner. As discussed above, the user may be a scheduler using a scheduling computer program to revise the dataset according to new inputs provided by the scheduler. For example, the scheduler may specify that the availability of a particular part has decreased, which may result in decreased production of other parts for which the first part is a component. For the scheduler, the manipulation of the dataset may be done using an application program, such as, for example, a scheduling application program that implements the scheduling methods described in the above-referenced U.S. patent application Ser. No. 08/321,603. In any event, typically, the user's interaction with the dataset will result in revisions to the dataset.

In step 405, the local server 203 determines whether another server (referred to hereinafter, for convenience, as a "remote server") is publishing revisions to the dataset to which the local server 203 has subscribed. This can be done, for example, by monitoring an input from the publisher 202 that indicates whether such revisions are waiting to be either partially published. Generally, datasets can be intersecting or coincident, so that published revisions may affect only a part of the dataset or the entire dataset.

If the publisher 200 is seeking to publish such revisions, then, in step 406, the local server 203 asks the user, through the client 204, whether the user wants to evaluate the published revisions for possible acceptance. Depending upon the nature of the activity in which the user is engaged, the user may want to reject the published revisions without even considering the content of those revisions. For example, in the scheduling context, a user may be engaged in analyzing the effect upon the schedule of a particular what-if scenario, e.g., the effect on a manufacturing schedule of the addition of an additional supplier of a particular part. Such an analysis will typically be independent of changes that other users of the database may be making. Consequently, the user will have no need to incorporate the published changes into the dataset with which the user is working and, in fact, may have reason not to do so, since such revisions may complicate the user's what-if analysis.

If the user does want to evaluate the published revisions, then, in step 407, the revisions are sent by the publisher 202 to the local server 203, so that the revisions can be evaluated. If the revisions are described using the net change management technique described above, then the user is given the changes that were made by the publishing user. For example, in the scheduling context, the changes might include reductions or increases in the production of a particular part, the availability of a particular machine or the availability of particular workers.

In step 408, based upon the evaluation of the published revisions, the user decides whether to accept the revisions or not. As explained above, if the user rejects the published revisions, then the user is prevented from publishing revisions made as a result of the user's activity with the dataset until such time as the user accepts all previously rejected revisions. If, however, the user accepts the published revisions, then the user may also accept further published revisions, as well as publish revisions resulting from the user's own activity. If a user that has previously rejected revisions later accepts a set of published revisions, then all previously rejected revisions are deemed accepted in the order in which the revisions were rejected. The user can then publish revisions at a later time. Whether or not a user accepts published revisions can depend on the nature of the user's activity (e.g., is the user performing what-if analysis?) as well as the content of the published revisions.

If the revisions are accepted, then the dataset is updated to reflect the revisions. Update of the dataset can occur in any of at least two ways. For example, all revisions can be provided and the server 203 can, if programmed appropriately, select only those revisions that affect the dataset to which the server 203 subscribes. Alternatively, the publisher 202, if programmed appropriately, can select only those revisions that affect the dataset to which the server 203 subscribes and send only those revisions to the server 203. As described above, in some situations, acceptance of a set of published revisions will result in the acceptance of a series of published revisions. This is possible because each set of published revisions is saved in a memory, along with information indicating the order in which the published revisions occurred.

In addition to receiving published changes (steps 405 through 408), the server 203 can publish changes (steps 409 through 411). In step 409, a determination is made as to whether the local server has checked out the dataset to which the local server has subscribed. This can be done by ascertaining the value of a variable (that may be part of the application program) stored in the server 203. As indicated above, the dataset must be checked out in order to enable the local server 203 to publish revisions made by the local server 203 to the dataset.

If the dataset has been checked out, then, in step 410, a determination is made as to whether revisions made by the local server 203 are to be published to remote servers 203 subscribing to datasets that intersect or coincide with the publishing dataset. Typically, the user instructs the local server 203 to publish revisions when the user has completed updating or analyzing the dataset. For example, a scheduler may publish changes after determining the effects on an existing schedule of increasing production of a particular part.

If revisions are to be published, then, in step 411, the revisions are used to update the database 201. The revisions are also presented to the other remote servers 203 subscribing to the same dataset. These remote servers 203 can accept or reject the published changes in the same manner as described above with respect to steps 405 through 408. Update of the database 201 or datasets on other servers 203 can be done in the manner described above.

Finally, in step 412, a determination is made as to whether the subscription to the dataset is to be revoked. This can be determined by, for example, monitoring the client 204 for an appropriate command from the user. Generally, the subscription to the dataset is not revoked so long as the user is still performing operations on the dataset.

If the subscription is revoked, then the use of, and revision to, the database 201 by the local server 203 is terminated, as shown by step 413.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A system for enabling multiple users to simultaneously access and change the contents of a database, comprising:

means for storing a master copy of the database;

means for storing a plurality of working copies of one or more datasets of the database;

means for allowing a corresponding one of the users to access and manipulate the contents of each of two or more of the working copies so that the contents of the two or more working copies can be revised;

means for enabling at least one user of the two or more working copies to publish revisions made to a working copy by the at least one user;

means for updating the contents of the master copy of the database with the published revisions;

means for presenting to each user of a working copy of a dataset that is affected by the revisions the option to accept or reject the inclusion of the revisions in that working copy;

means for updating the working copy of each dataset with accepted published revisions that affect that dataset; and means for preventing each user that has rejected the inclusion of revisions in the user's working copy of a dataset from publishing revisions.

2. A system as in claim 1, wherein:

the means for storing a master copy further comprises a persistent data storage means;

the means for storing a plurality of working copies further comprises a plurality of non-persistent, rapidly accessible memory means;

the means for allowing further comprises a plurality of combinations of one or more client computers and a server computer;

the means for enabling further comprises a publishing computer;

means for updating the master copy further comprises a publishing computer;

means for presenting further comprises a plurality of combinations of one or more client computers and a server computer;

means for updating the working copy further comprises a publishing computer and a server computer; and the means for preventing further comprises a publishing computer.

3. A method for enabling multiple users to simultaneously access and change the contents of a database, comprising:

storing a master copy of the database;

storing a plurality of working copies of one or more datasets of the database;

allowing a corresponding one of the users to access and manipulate the contents of each of two or more of the working copies so that the contents of the two or more working copies can be revised;

enabling at least one user of the two or more working copies to publish revisions made to a working copy by the at least one user;

updating the contents of the master copy of the database with the published revisions;

presenting to each user of a working copy of a dataset that is affected by the revisions the option to accept or reject the inclusion of the revisions in that working copy;

updating the working copy of each dataset with accepted published revisions that affect that dataset; and preventing each user that has rejected the inclusion of revisions in the user's working copy of a dataset from publishing revisions.

4. A system as in claim 1, further comprising:

means for storing, for each working copy of a dataset for which at least one set of published revisions has been rejected, a set of cumulative revisions representing the cumulative changes made to the working copy of the dataset by the set or sets of published revisions that have been rejected; and means for updating such a working copy of a dataset with the corresponding set of cumulative revisions whenever current published revisions affecting the working copy of the dataset are accepted.

5. A system as in claim 1, wherein:

the means for storing a master copy further comprises a persistent data storage means; and the means for storing a plurality of working copies further comprises a plurality of non-persistent, rapidly accessible memory means.

6. A system as in claim 1, wherein:

the means for storing a master copy further comprises a persistent data storage means; and the means for storing a plurality of working copies further comprises a persistent data storage means.

7. A system as in claim 1, wherein the database is an object-oriented database.

8. A system as in claim 1, wherein the database is a relational database.

9. A system as in claim 1, further comprising means for enabling a user that has previously rejected revisions to the working copy of a dataset being used by that user to accept one or more previously rejected revisions.

10. A system for mediating use of a database by a plurality of users, comprising:

means for enabling each of the users to obtain a working copy of a dataset, each dataset including some portion or all of the data in the database;

means for enabling a user to revise the data in a working copy of a dataset obtained by that user;

means for enabling a user to publish a set of revisions made to a working copy of a dataset;

means for determining, for each working copy of a dataset affected by a current set of published revisions, whether to accept or reject incorporation of the current set of published revisions into the affected working copy of the dataset;

means for updating an affected working copy of a dataset with a set of accepted published revisions; and means for preventing publication of a set of revisions from, or acceptance of a set of published revisions by, each working copy of a dataset for which a previous set of published revisions was rejected.

11. A system as in claim 10, wherein:

the means for enabling a user to revise further comprises means for storing net changes in the data values of the working copy of a dataset obtained by that user, the net changes representing a difference between an initial set of data values and an ending set of data values, wherein:

the initial set of data values of a working copy of a dataset are the data values either immediately after the working copy of the dataset has been obtained by the user or immediately after the user has published revisions made to the working copy of the dataset;

the ending set of data values of a working copy of a dataset are the data values immediately before the user publishes revisions made to the working copy of the dataset; and each set of published revisions comprises the net changes between the most recent initial and ending sets of data values for the working copy of the dataset; and the means for updating further comprises means for adding the net changes corresponding to a published set of revisions to the data values of each working copy of a dataset for which the published revisions are accepted.

12. A system as in claim 11, wherein the means for enabling a user to revise further comprises means for storing, in addition to the net changes, one of the initial set of data values or ending set of data values.

13. A system as in claim 11, further comprising:

means for associating each set of net changes with each working copy of a dataset for which the net changes were rejected;

means for enabling a user of a working copy of a dataset for which a set of net changes were rejected to accept a set of rejected net changes that affect that working copy of a dataset; and means for updating that working copy of a dataset with one or more sets of previously rejected net changes.

14. A system as in claim 10, further comprising:

means for associating each set of published revisions with each working copy of a dataset for which the published revisions were rejected;

means for enabling a user of a working copy of a dataset for which a set of published revisions were rejected to accept a set of rejected published revisions that affect that working copy of a dataset; and means for updating that working copy of a dataset with one or more sets of previously rejected published revisions.

15. A method for mediating use of a database by a plurality of users, comprising the steps of:

enabling each of the users to obtain a working copy of a dataset, each dataset including some portion or all of the data in the database;

enabling a user to revise the data in a working copy of a dataset obtained by that user;

enabling a user to publish a set of revisions made to a working copy of a dataset;

determining, for each working copy of a dataset affected by a current set of published revisions, whether to accept or reject incorporation of the current set of published revisions into the affected working copy of the dataset;

updating an affected working copy of a dataset with a set of accepted published revisions; and preventing publication of a set of revisions from, or acceptance of a set of published revisions by, each working copy of a dataset for which a previous set of published revisions was rejected.

16. A method as in claim 15, further comprising the step of updating the database with each set of published revisions.

17. A method as in claim 15, wherein:

the step of enabling a user to revise further comprises the step of storing net changes in the data values of the working copy of a dataset obtained by that user, the net changes representing a difference between an initial set of data values and an ending set of data values, wherein:

the initial set of data values of a working copy of a dataset are the data values either immediately after the working copy of the dataset has been obtained by the user or immediately after the user has published revisions made to the working copy of the dataset;

the ending set of data values of a working copy of a dataset are the data values immediately before the user publishes revisions made to the working copy of the dataset; and each set of published revisions comprises the net changes between the most recent initial and ending sets of data values for the working copy of the dataset; and the step of updating further comprises the step of adding the net changes corresponding to a published set of revisions to the data values of each working copy of a dataset for which the published revisions are accepted.

18. A method as in claim 17, wherein the step of enabling a user to revise further comprises the step of storing, in addition to the net changes, one of the initial set of data values or ending set of data values.

19. A method as in claim 17, further comprising, after the step of determining, the steps of:

associating each set of net changes with each working copy of a dataset for which the net changes were rejected;

enabling a user of a working copy of a dataset for which a set of net changes were rejected to accept a set of rejected net changes that affect that working copy of a dataset; and updating that working copy of a dataset with one or more sets of previously rejected net changes.

20. A method as in claim 15, further comprising, after the step of determining, the steps of:

associating each set of published revisions with each working copy of a dataset for which the published revisions were rejected;

enabling a user of a working copy of a dataset for which a set of published revisions were rejected to accept a set of rejected published revisions that affect that working copy of a dataset; and updating that working copy of a dataset with one or more sets of previously rejected published revisions.

* * * * *

UNITED STATES PATENT AND TRADEMARK OFFICE
CERTIFICATE OF CORRECTION

PATENT NO. : 5,751,958

DATED : May 12, 1998

INVENTOR(S) : Monte Zweben, et al.

It is certified that error appears in the above-identified patent and that said Letters Patent is hereby corrected as shown below:

Column 14, line 59, before "revisions" insert --published--.

Column 14, line 60, before "revisions" insert --published--.

Column 14, line 66, before "revisions" insert --published--.

Column 15, line 38, before "revisions" insert --published--.

Column 15, line 43, before "revisions" insert --published--.

Column 15, line 48, before "revisions" insert --published--.

Column 15, line 54, before "revisions" insert --published--.

Column 16, line 6, before "revisions" insert --published--.

Column 16, line 8, before "revisions" insert --published--.

UNITED STATES PATENT AND TRADEMARK OFFICE
CERTIFICATE OF CORRECTION

PATENT NO. : 5,751,958
DATED : May 12, 1998
INVENTOR(S) : Monte Zweben, et al.

It is certified that error appears in the above-indentified patent and that said Letters Patent is hereby corrected as shown below:

In the Claims

21. A system as in Claim 9, further comprising means for preventing each user that has rejected the inclusion of published revisions in the user's working copy of a dataset from receiving subsequent published revisions until the rejecting user accepts all previously rejected published revisions.

22. A method as Claim 3, further comprising the steps of:
    storing, for each working copy of a dataset for which at least one set of published revisions has been rejected, a set of cumulative published revisions representing the cumulative changes made to the working copy of the dataset by the set or sets of published revisions that have been rejected; and
    updating such a working copy of a dataset with the corresponding set of cumulative published revisions whenever current published revisions affecting the working copy of the dataset are accepted.

23. A method as Claim 3, further comprising the step of enabling a user that has previously rejected published revisions to the working copy of a dataset being used by that user to accept one or more previously rejected published revisions.

UNITED STATES PATENT AND TRADEMARK OFFICE
CERTIFICATE OF CORRECTION

PATENT NO. : 5,751,958
DATED : May 12, 1998
INVENTOR(S) : Monte Zweben, et al.

It is certified that error appears in the above-indentified patent and that said Letters Patent is hereby corrected as shown below:

24. A method as Claim 23, further comprising the step of preventing each user that has rejected the inclusion of published revisions in the user's working copy of a dataset from receiving subsequent published revisions until the rejecting user accepts all previously rejected published revisions.

Signed and Sealed this

Twenty-third Day of November, 1999

Attest:

Q. TODD DICKINSON

*Attesting Officer*

*Acting Commissioner of Patents and Trademarks*

UNITED STATES PATENT AND TRADEMARK OFFICE
CERTIFICATE OF CORRECTION

PATENT NO. : 5,751,958
DATED : May 12, 1998
INVENTOR(S) : Zweben et al.

It is certified that error appears in the above-identified patent and that said Letters Patent is hereby corrected as shown below:

Title page, item [56], insert the following:
" 5,623,659   4/1997   Shi et al. ..................... 395/608,"

-- FOREIGN PATENT DOCUMENTS 6-162041   10/1994   Japanese Patent Office --.

```
Abstract,  line 7,    delete "the";
Column 3,  line 26,   after "each", insert --of--;
Column 3,  line 52,   delete ".  By", insert --by--;
Column 3,  line 60,   after "servers", insert --,--;
Column 3,  line 61,   after "overcome", insert --,--;

Column 8,  line 34,   after "Daun", delete --"--;
Column 13, line 2,    delete "either";
Column 13, line 3,    delete "partially";
Column 13, line 3,    after "be", insert --either partially--;
Column 15, line 13,   before "means", insert --the--;
Column 15, line 15,   before "means", insert --the--;
Column 15, line 18,   before "means", insert --the--;
Column 15, line 39,   before "revisions", insert --published--;
```

Signed and Sealed this

Twenty-sixth Day of September, 2000

Attest:

Q. TODD DICKINSON

*Attesting Officer*          *Director of Patents and Trademarks*